March 2, 1971  R. J. COLLIER ET AL  3,567,305
HOLOGRAM MASKING TECHNIQUES
Filed Oct. 18, 1966  5 Sheets-Sheet 1
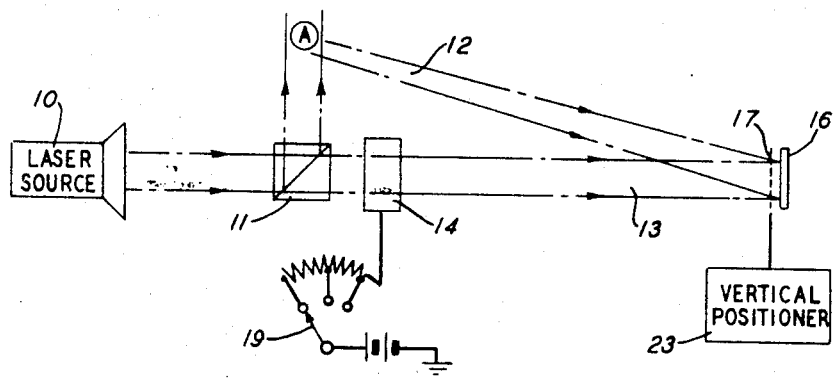
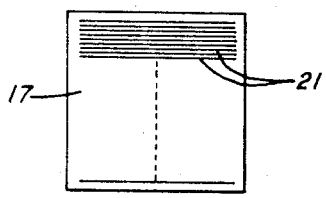
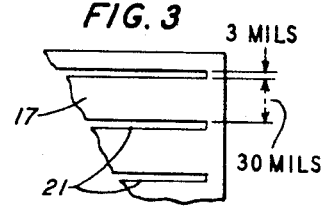
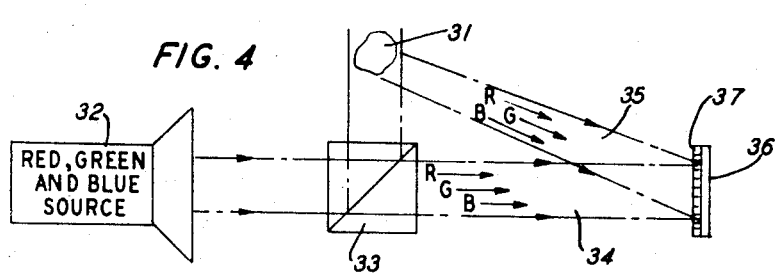
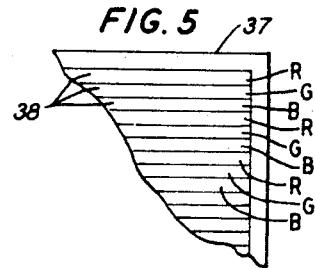
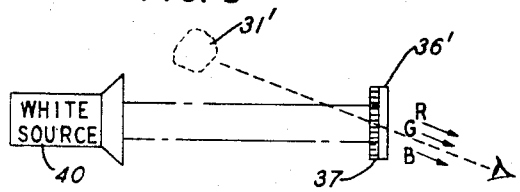
INVENTORS R.J. COLLIER
L.H. LIN
K.S. PENNINGTON
BY R.B. Anderson
ATTORNEY

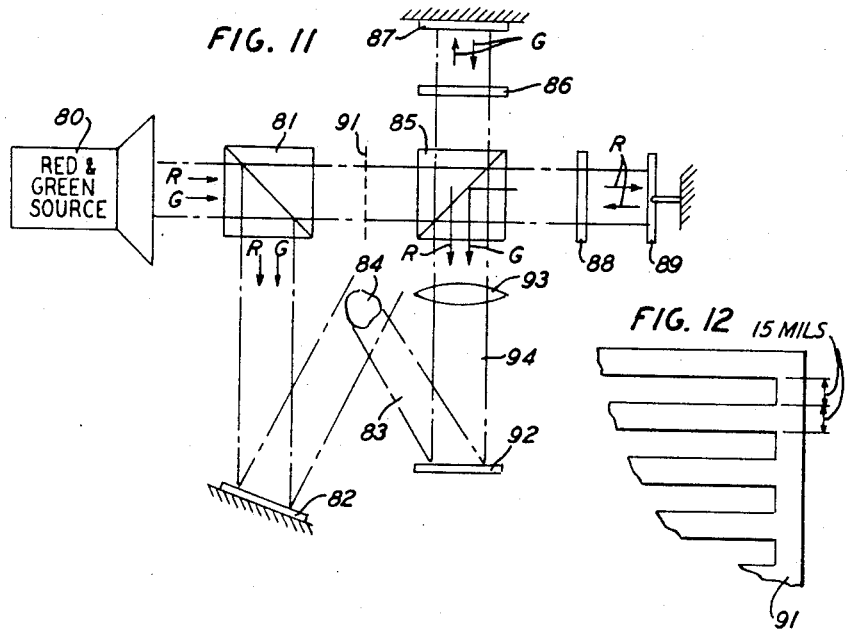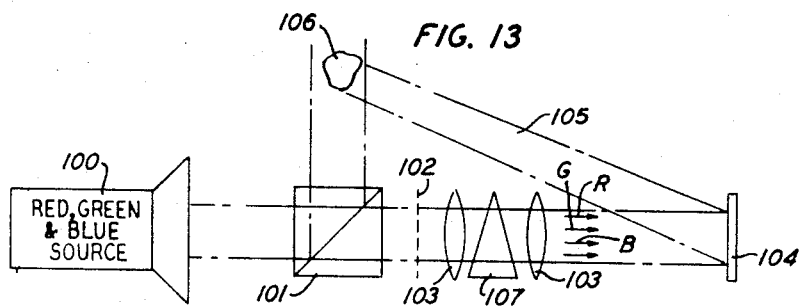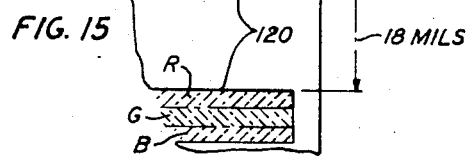

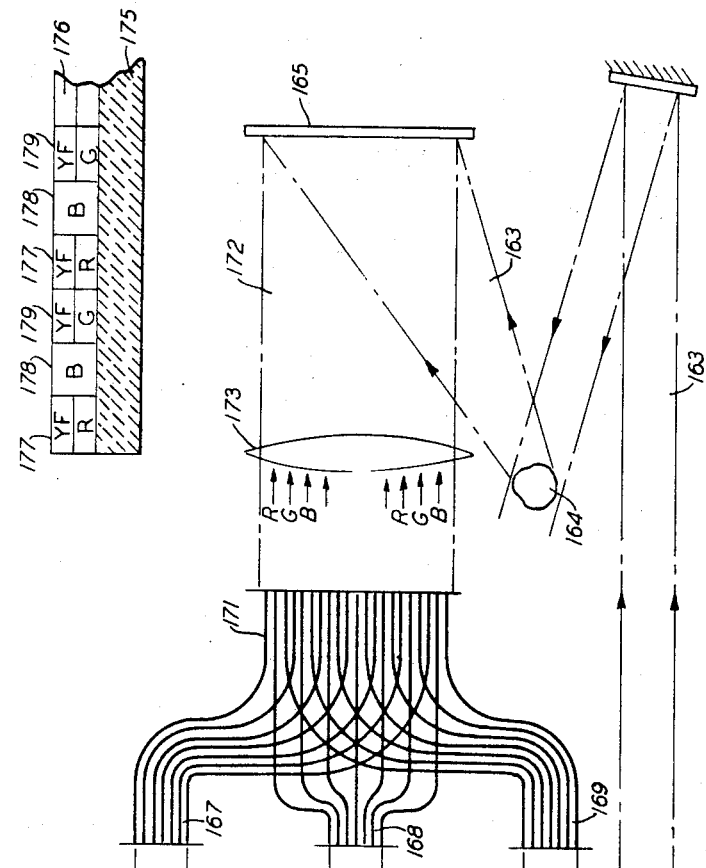
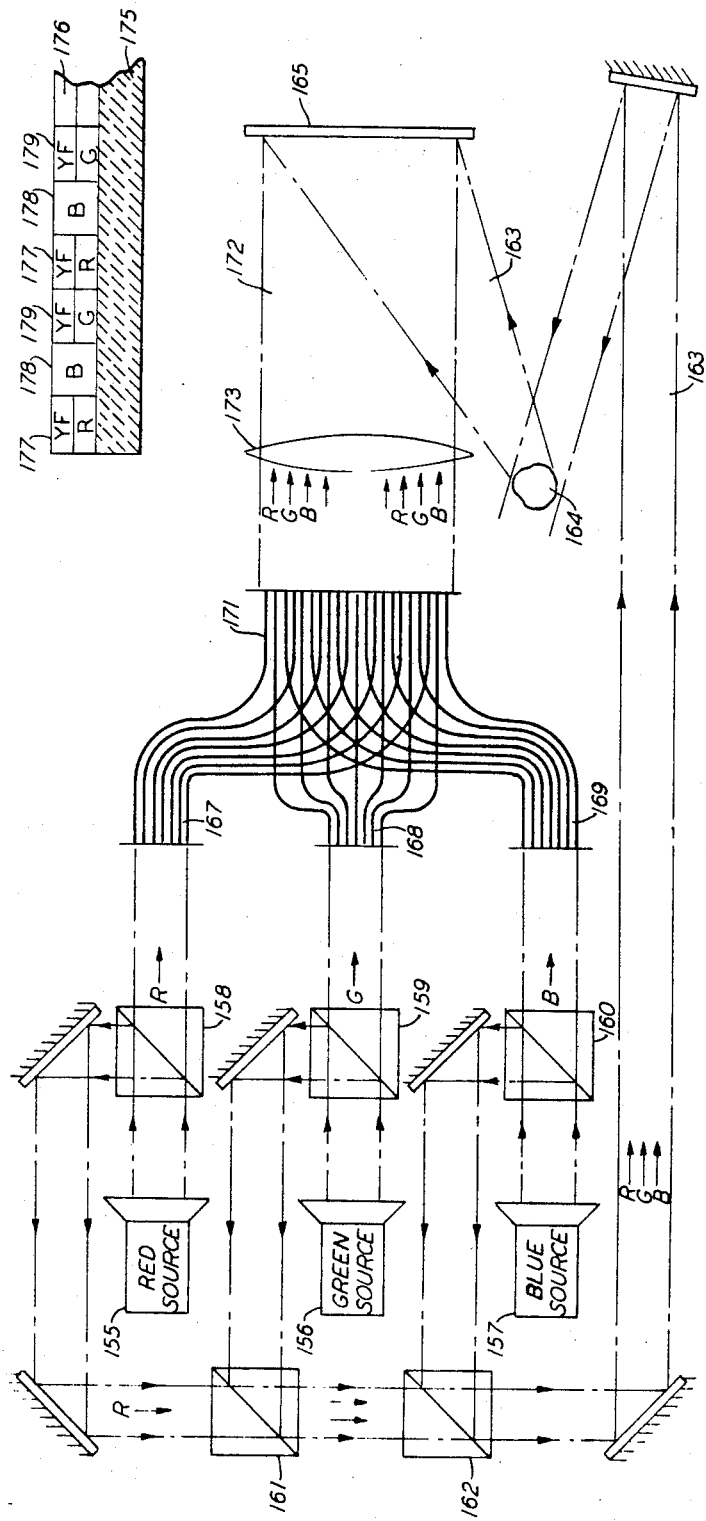
FIG. 20
FIG. 21

United States Patent Office 3,567,305
Patented Mar. 2, 1971

3,567,305
HOLOGRAM MASKING TECHNIQUES
Robert J. Collier, New Providence, Lawrence H. Lin, Plainfield, and Keith S. Pennington, Basking Ridge, N.J., assignors to Bell Telephone Laboratories, Incorporated, Murray Hill and Berkeley Heights, N.J.
Filed Oct. 18, 1966, Ser. No. 587,606
Int. Cl. G02b 27/00
U.S. Cl. 350—3.5                    29 Claims

ABSTRACT OF THE DISCLOSURE

Methods and apparatus are disclosed for increasing the hologram storage capacity of a recording medium. With the aid of various masking techniques, each hologram is stored in a large group of small areas or volumes dispersed throughout the recording medium; and at least some holograms are stored in different groups.

---

This invention relates to holograms, and more particularly, to methods and apparatus for increasing the quantity of information that can be stored on holograms.

A hologram is a photographic recording of light wave interference patterns that result from simultaneous impingement on a photographic medium of a reference light beam and light from a subject being recorded. After the photographic medium has been developed, the recorded interference patterns constitute a complex diffraction grating that is capable of constructively diffracting properly directed illuminating light to reconstruct an image of the recorded subject. Several techniques have been described for recording a number of different subjects on one photographic medium and reconstructing them independently without confusion. Generally speaking, the same techniques can be adapted to the recording of multicolor subjects since multicolor hologram recordings are actually composed of a number of superimposed single color recordings.

A major requirement for the superimposition of hologram recordings is the minimizing or the elimination of crosstalk. Crosstalk is a spurious reconstruction of subject images other than those intended to be reconstructed by the illuminating beam or an illuminating beam component. If the superimposed holograms are recordings of separate subjects which are intended to be selectively retrieved, crosstalk occurs when reconstructions of subjects other than the desired subject are made in response to a specific illumination. Crosstalk in multicolor holograms is manifested by displaced single-color images which may overlap and obscure the desired multicolor image.

The most common technique for avoiding crosstalk is the use of an optically thick photographic medium on which are recorded "volume" holograms; that is, holograms defined by diffraction grating patterns that have an appreciable thickness dimension. As is well known, volume holograms can be made to be frequency selective so as to avoid crosstalk in multicolor reconstructions, and if sufficiently wide angles between the subject and reference beams are used, independent single-color subjects can be recorded and reconstructed without crosstalk. For many purposes the requirement of a thick photographic medium is a serious limitation because, for example, replicas of volume holograms cannot be easily made from a master hologram.

Another limitation on the use of superimposed holograms is the dynamic range of the photographic medium that is used. The recording of a hologram, like the recording of a photograph, generally requires a photographic emulsion having a transmissivity that changes linearly with respect to the exposure. Depending on the emulsion used, the number of exposures that can be made in the linear region of the emulsion, within which this requirement is met, is limited. We have found that for many purposes, the dynamic range rather than the resolution of the photographic medium limits the number of superimposed recordings that can be made; that is, substantial sacrifice of resolution could be made if the dynamic range of the photographic medium could be increased.

In accordance with our invention, either one or both of the problems of crosstalk and limited dynamic range of the photographic medium can be substantially alleviated. It is a predominant feature of our invention that separate information quanta be recorded on different groups of small areas dispersed over the photographic medium. The individual areas upon which the recording is made are sufficiently small, and each group of areas is sufficiently dispersed throughout the medium that when the recorded image is reconstructed, it appears to emanate uniformly from the entire medium. By using appropriate masks, only one area group may be illuminated and so the spurious reconstructions responsible for crosstalk can be eliminated. Further, the dynamic range of each area group is the same as the dynamic range of the photographic medium as a whole; as a result, the number of superimposed recordings that can be made on a given medium is effectively multiplied by the number of area groups that are established within the medium.

In an illustrative embodiment of the invention, a plurality of superimposed hologram recordings are made on a three-dimensional photographic medium by successively directing light from different subjects at the medium at different impingement angles in the manner described in the copending application of K. S. Pennington, Ser. No. 538,368, filed Mar. 29, 1966, now abandoned, and assigned to Bell Telephone Laboratories, Incorporated. A mask defining an array of parallel elongated apertures approximately 3 mils wide permits only closely spaced strips of the photographic medium to be exposed. The number of different subjects that can be recorded is, of course, limited by the dynamic range of the photographic medium. After the maximum number of subjects have been recorded, the mask is shifted to expose a new array of strips of the photographic medium that are displaced from the exposed strips. In this way, an entirely new set of subjects can be recorded up to the maximum permitted by the dynamic range of the medium and the storage capacity is effectively multiplied by the number of area groups that can be separately defined.

After the development of the photographic medium, any of the recorded subjects can be reconstructed by replacing the mask over the developed hologram in a position corresponding to that at which the subject was recorded, and directing illuminating light against the mask at the proper angle in accordance with the teachings of the Pennington application. Other recorded subjects can be selectively retrieved by positioning the mask to reveal only the area groups containing the desired recording and illuminating it properly, as is known. Each reconstructed image is recognizable by the observer and appears to emanate from the entire medium because each individual area illuminated is small. If so desired, several holograms can be recorded on a two-dimensional photographic medium by making only one exposure at each position of the mask. During reconstruction, crosstalk is obviated by properly replacing the mask in the proper position for illuminating only the desired hologram; the other holograms cannot give the spurious diffraction responsible for crosstalk because they are not illuminated.

In another illustrative embodiment, a multicolor hologram is made on a two-dimensional photographic medium by overlaying the medium with a mask of filter strips each of which transmits only one of the colors to be recorded. Assuming that the subject and reference light beams contain the optical frequencies corresponding to the colors red, green and blue, the mask includes alternate red, green, and blue filter strips. The red light components therefore form diffraction gratings only on the strips of photographic medium exposed to red light with the green and blue exposures being similarly segregated. The recorded multicolor image is reconstructed by illuminating the developed hologram through the same filters used during recording. Since the red light is admitted only through the red filter, it cannot interact with the diffraction gratings representative of the green and blue information, and crosstalk is eliminated even though the hologram is not a volume hologram having three dimensions. If, as described before, the different single-color recordings are properly dispersed throughout the medium so that they cannot be separately resolved, then upon reconstruction, each of the colors appears to emanate from the entire hologram and a single multicolor subject is perceived.

These and other embodiments of the invention together with other advantages and features of the invention will be better understood from a consideration of the following detailed description taken in conjunction with the accompanying drawing in which:

FIG. 1 is a schematic view of hologram recording apparatus in accordance with one embodiment of the invention;

FIG. 2 is a front view of a mask used in the apparatus of FIG. 1;

FIG. 3 is an enlarged front view of part of the mask of FIG. 2;

FIG. 4 is a schematic view of hologram recording apparatus in accordance with another embodiment of the invention;

FIG. 5 is a front view of part of a mask used in the apparatus of FIG. 4;

FIG. 6 is a schematic view of hologram reconstructing apparatus in accordance with the embodiment of FIG. 4;

FIG. 11 is a schematic view of hologram recording apparatus in accordance with another embodiment of the invention;

FIG. 12 is a front view of part of a mask used in the apparatus of FIG. 11;

FIG. 13 is a schematic view of hologram recording apparatus in accordance with another embodiment of the invention;

FIG. 14 is a schematic view of hologram recording apparatus in accordance with another embodiment of the invention;

FIG. 15 is a front view of part of a mask used in the apparatus of FIG. 14;

FIG. 20 is a schematic view of hologram recording apparatus in accordance with still another embodiment of the invention; and FIG. 21 is a schematic cross-sectional view of a photographic medium in accordance with another embodiment of the invention.

Figure 7:
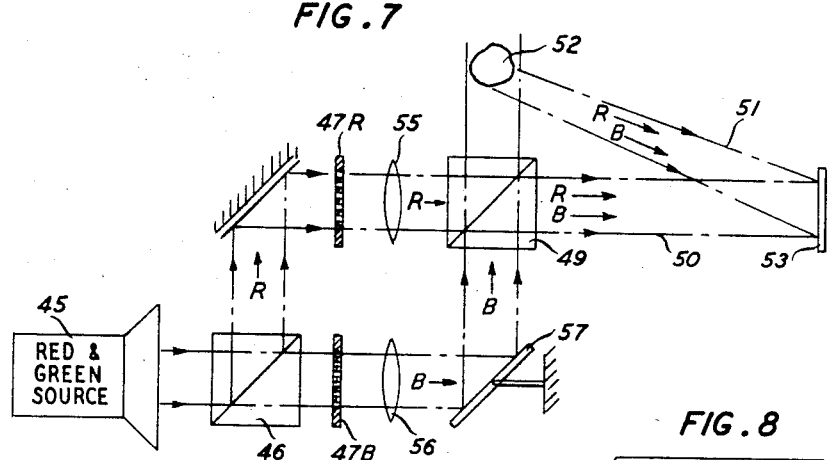
FIG. 7 is a schematic view of hologram recording apparatus in accordance with another embodiment of the invention.

Referring now to FIG. 1, there is shown an illustrative embodiment of the invention comprising a laser source 10 for forming and projecting a coherent light beam that is divided into two components by a beam splitter 11. One light component is reflected from a subject A to form a subject light beam 12 while the other component which constitutes a reference beam 13, is projected through an electro-optic medium 14. The subject and reference beams impinge at different angles on a photographic medium 16 that is overlaid by a mask 17. The subject and reference beams are shown as being derived from a common source because, as is known, hologram formation requires that the interfering beams be phase related.

The apparatus operates in a manner described in the aforementioned Pennington application; that is, multiple exposures of photographic medium 16 are made by successively directing at the medium light from other subjects in addition to the subject A. With each successive exposure, the voltage on electro-optic medium 14 is changed by moving a switch arm 19 of a rheostat connected to the electro-optic medium. Each of the subjects recorded, with the mask 17 in the position shown, is located at a different angular position with respect to the photographic medium 16. Since the electro-optic medium 14 deflects the reference beam 13 as a function of applied voltage, both the subject and reference beams of each successive exposure impinge on the photographic medium at different characteristic angles. After the photosensitive medium 16 has been developed to form a hologram, any of the recorded subjects can be reconstructed by illuminating the hologram with reference beam light impinging at the same angle which was used when that subject was being recorded. By replacing the hologram back in the same position that was used during recording, any of the recorded subjects can be reconstructed by moving the switch arm 19 to apply a voltage on the electro-optic medium 14 that corresponds to the voltage used during recording of that subject.

The number of subjects that can be superimposed is limited by the dynamic range of the photographic medium 16. For example, consider the case when a maximum of 10 exposures of the photographic medium may be made before the transmissivity of the developed hologram becomes a nonlinear function of the exposure to successive subjects. This limitation is not affected by the presence or absence of the mask 17; if the maximum number of exposures without the mask is 10, the maximum number with the mask is also 10.

As is shown more clearly in FIGS. 2 and 3, the mask 17 includes a large number of elongated apertures 21 each of which may be on the order of 3 mils wide with successive spacings of 30 mils. The width of the apertures is so small and the spacings between them are so small that they cannot be separately resolved during reconstruction. For example, when the subject A of FIG. 1 is reconstructed by projecting light through the mask 17 onto the developed hologram, the observer sees a complete reconstruction emanating from the entire hologram rather than a series of independent reconstructions. A reconstruction made from hologram apparatus with the mask 17 will differ from a comparable one made without the mask only in that the resolution of the reconstructed image will be degraded as a function of the width and spacing of the apertures 21. If the width and spacing are larger than those shown, the resolution will be decreased, while if the width and spacing are made smaller the resolution will be enhanced.

In accordance with this embodiment, different groups of subjects are recorded on the photographic medium 16 with the mask 17 in a different position for each group. For example, one group of 10 subjects is recorded with the mask in a first position. A vertical positioner 23 of FIG. 1 then moves the mask vertically a distance of 3 mils to expose another group of areas of the photographic medium 16. A second group of 10 subjects is then recorded on the newly exposed group of areas of the photographic medium. Thereafter, the mask 17 is moved vertically to expose still another group of areas that have not previously been exposed for the recording of a third group of subjects. Since the apertures 21 of the mask are each separated by 30 mils, the mask can be vertically moved through 3 mils ten times to make separate exposures of eleven area groups of the photographic medium 16. Assuming that the dynamic range of the medium permits ten superimposed exposures, the total number of exposures that can be made is 110. Hence, by the provision of the mask 17, the capacity of the photographic medium 16 to store information is increased by a factor of eleven. During reconstruction of any of the recorded subjects, the mask 17 is placed in a position with respect to the illuminating beam that corresponds to its position in the recording process. Any one of the subjects which is stored on the group of areas exposed by the mask 17 can then be reconstructed by directing the illuminating beam at the proper angle as described before.

In addition to increasing the information storage capacity of a three-dimensional photographic medium, the mask 17 of FIG. 1 can also be used for multiple storage of information on a two-dimensional medium. However, when medium 16 of FIG. 1 is a two-dimensional medium, the mask 17 should be moved after each exposure so that only one exposure is made at each position of the mask. Each of the recorded subjects can then be independently reconstructed by appropriately locating the mask over the developed hologram so that only the area group containing the information to be retrieved is illuminated. Since all other parts of the hologram are masked, the illuminating beam cannot be diffracted by the holograms of other recorded subjects, and crosstalk is eliminated.

The crosstalk elimination feature of our invention is employed in the embodiment of FIG. 4 for the purpose of making a multicolor hologram on a two-dimensional photographic medium. A multicolor recording, like superimposed single frequency recordings, cannot ordinarily be made on a two-dimensional medium (at least without special compensating provisions) because of intolerable crosstalk during reconstruction; the red light component of the reconstructing illuminating beam is, for example, diffracted by the hologram grating representative of the blue color information to give a spurious displaced red image of the subject that distorts the desired image. In the apparatus of FIG. 4 a three color recording of a subject 31 is made on a three-dimensional photographic medium 36 by projecting red, green, and blue coherent light from a source 32 through a beam splitter 33 which establishes a reference beam 34 and a subject beam 35 that is reflected from the subject. The photographic medium 36, toward which the subject and reference beams are directed, is overlaid by a filter mask 37. As shown by the partial view of FIG. 5, the filter mask 37 comprises a plurality of parallel elongated filter strips 38, each of which are capable of transmitting only one of the three colors projected by the coherent light source 32. The color which each of the filter strips transmits is indicated in FIG. 5 by the letters representative of the three different colors. As can be seen by the figure, the strips are arranged successively according to color so that each of the colors is distributed uniformly throughout the mask.

During the recording process, red light is reflected predominately from the red portions of the subject 31 and is transmitted only through the red filter strips of mask 37 to the light sensitive medium 36 where it interferes with red reference beam light to form a diffraction grating representative of the red color information from the subject. Likewise, the other colors are transmitted through their respective filter strips to form gratings representative of the other color information of the subject.

Referring to FIG. 6, after the photographic medium has been developed to form a hologram 36', the recorded multicolor subject can be reconstructed by illuminating the hologram with white light from a source 40. The filter mask 37 overlays the hologram 36' with precisely the same orientation that it had with respect to the photographic medium 36 of FIG. 4. Preferably, the photographic medium 36 is developed into hologram 36' without removing the mask 37. The mask, of course, filters the white light so as to permit only red light to illuminate certain area groups of the hologram, only green light to illuminate others, and only blue light to illuminate a third area group. These area groups, of course, correspond to those made during the recording process and the various color components of the white light are diffracted as shown to give a multicolor virtual image 31' of the recorded subject. The various filter strips prevent light of one color from interacting with the diffraction gratings representative of the information of a different color and therefore eliminate crosstalk even though the hologram 36' is not a volume hologram.

Figure 8:
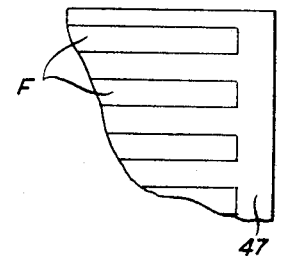
FIG. 8 is a front view of part of a mask used in the apparatus of FIG. 7.

The embodiment of FIG. 7 illustrates a technique for making a multicolor hologram on a two-dimensional medium by imaging of filter masks on the medium rather than physically overlaying the masks upon the medium. The apparatus comprises a source 45 of coherent red and blue light which is directed through a beam splitter 46 to establish two components one of which is directed through a red filter mask 47R, the other being directed through a blue filter mask 47B. The two components are then mixed in a second beam splitter 49 which directs a reference beam 50 and a subject beam 51 reflected from a subject 52 against a photographic medium 53. The mask 47R is imaged onto the photographic medium 53 by an imaging lens 55 while the mask 47B is imaged onto the photographic medium by imaging lens 56. As illustrated in FIG. 8, the major portion of the masks 47R and 47B is opaque with parallel filter strips F which are separated by a distance equal to approximately their own width. The filter strips F of mask 47R transmit only red light while the strips F of mask 47B transmit only blue light. The blue light component is directed toward the beam splitter 49 by a pivoted adjustable mirror 57.

Since the masks 47R and 47B are imaged on the photographic medium 53, the operator, with the aid of a magnifying glass or microscope, is able to observe bands or strips of red and blue light on the surface of the photographic medium 53. Hence, before light is reflected from the subject 52, the operator can interleave the bands of red and blue light impinging on the photographic medium 53 by appropriately pivoting the adjustable mirror 57. Since the opaque portions of each mask are approximately equal in width to the filter portions, the color bands can be interleaved with little or no overlap. During alignment and registration, the photographic medium should be masked to prevent exposure.

After this adjustment is made, the photographic medium can be exposed to the subject and reference beams 50 and 51 as shown for formation of red and blue diffraction gratings. Since the light reflected from the subject 52 is diffused, the color components of the subject beam 51 are not restricted to the single-color strips defined by the masks. The color components of the subject beam light will, however, only constructively interfere with reference beam components of the same color so that the red diffraction gratings are restricted to one area group and the blue gratings to the other area group. Exposure of the blue area groups to red subject beam light merely contributes to background noise of the developed hologram and cannot of itself give rise to crosstalk or other serious problems. The recorded multicolor image is reconstructed by illuminating the developed hologram with reference beam light 50 with the hologram in the same relative position as the photographic medium shown in the figure. As before, only the area group containing red light information will be exposed to red illuminating light during reconstruction and crosstalk is eliminated.

Figure 9:
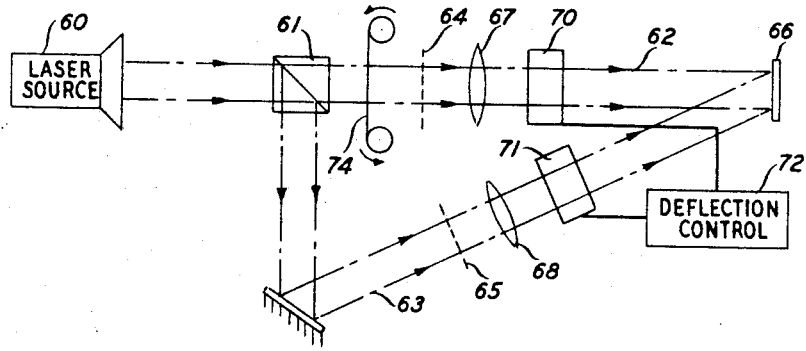
FIG. 9 is a schematic view of hologram recording apparatus in accordance with another embodiment of the invention.

FIG. 9 shows apparatus in which imaged masks are used for recording a plurality of subjects on a single two-dimensional medium. The apparatus includes a single-frequency laser source 60 for forming a light beam that is split by a beam splitter 61 into a subject beam 62 and a reference beam 63. Apertured masks 64 and 65, which may be identical to the mask of FIGS. 2 and 3, are located in the subject and reference beam paths and are imaged on a photographic medium 66 by imaging lenses 67 and 68. The subject and reference beams are capable of being deflected by two electro-optic mediums 70 and 71; as was mentioned before, an electro-optic medium will deflect a light beam in accordance with the electrical voltage applied thereto. Both mediums 70 and 71 are connected to a common control source 72 so that both the subject and reference beams can be deflected in registration. Located in the subject beam path is a roll of transparent film 74 upon which is printed a series of subjects to be recorded on the photographic medium 66. As indicated by the arrow, the film can be advanced transversely to the subject beam path for exposure of successive subjects printed on the film.

The various subjects on film 74 are successively recorded on the photographic medium 66 by deflecting the subject and reference beams to a new position during each recording to expose a different area group of the photographic medium. During the recording of the first subject, the subject and reference beams are aligned so that the images of masks 63 and 64 precisely overlap on the photographic medium to expose a first group of strips on the photographic medium. When the second subject is recorded the subject and reference beams are displaced an equal amount vertically so that a new group of strips on the photographic medium is exposed. As in the apparatus of FIG. 1, a large number of discrete area groups can be exposed without any overlap of the various groups. When the photographic medium 66 is developed, any of the recorded subjects can be reconstructed by illuminating the hologram with reference beam 63 and with the mask 65 imaged in the proper location on the developed hologram. Since only the desired recording is illuminated, there can be no crosstalk even if the hologram is not a volume hologram.

Figure 10:
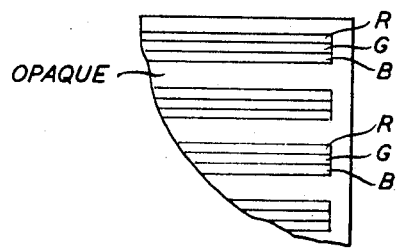
FIG. 10 is a front view of part of a mask which may be used in the apparatus of FIG. 9.

By using a three-dimensional photographic medium, however, the apparatus of FIG. 9 can be used to record multiple multicolor holograms. Assume for example that the mask of FIG. 10 is substituted for the masks 64 and 65 of FIG. 9 and a multicolor source is substituted for the laser 60. The mask of FIG. 10 includes groups of parallel red, green and blue filter strips each separated by a distance equal to the width of each group. The apparatus of FIG. 9 is used to record a first multicolor subject by registering the projected images of the subject and reference beams so that a transmitted light of each color of the reference beam overlaps the transmitted light of the same color of the subject beam. The second exposure is made by deflecting the subject and reference beams 62 and 63 of FIG. 9 so that the previously masked area group of the photographic medium 66 is exposed to the light transmitted through the filters of the masks. Again the various colors impinging on the photographic medium are segregated from each other. After the photographic medium has been developed, either of the recorded subjects can be reconstructed by using a white light reference beam with the mask 65 imaged in a position corresponding with the position at which that subject was recorded. Crosstalk is eliminated because the red light components of the white light source impinge only on groups of areas of the developed hologram which contain the red light information.

Referring now to FIG. 11, there is shown an arrangement similar to the embodiment of FIG. 7 which uses an apertured mask rather than a filter mask. Light from a red and green source is projected to a beam splitter 81 that reflects part of both light components to a mirror 82 for forming a subject beam 83 that is reflected from a subject 84. The remainder of the light is projected to a second beam splitter 85 which separates it into a green component that passes through a green filter 86 to be reflected from a fixed mirror 87, and a red component that passes through a red filter 88 and is reflected from a pivoted mirror 89. An apertured mask 91 is imaged onto a photographic medium 92 by an imaging lens 93. As is shown in FIG. 12, the mask 91 includes an array of equally spaced elongated apertures or slots.

Because the coherent light passes through the mask 91 before being divided into color components by the beam splitter 85, the light reflected from mirror 87 is in the form of an array of green bands, while the light reflected from mirror 89 is in the form of an array of red bands. These two color components are recombined by the beam splitter 85 to form a reference beam 94. The bands of red and green light maintain their distinctive configuration when projected onto the photographic medium because the mask 91, as mentioned before, is imaged onto the photographic medium by the lens 93. Before the photographic medium is exposed for recording, the pivoted mirror 89 is adjusted so that the green bands falling on the surface of the photographic medium are interleaved by the red color bands. As a result, discrete regions of red and green color interference are made with the subject beam 83, and reconstruction without crosstalk can be made by illuminating the developed hologram with the reference beam 94 which is formed as shown.

FIG. 13 shows a less complicated apparatus for splitting up the color components of the reference beam after it has been transmitted through an apertured mask. A red, green and blue source 100 directs coherent light through a beam splitter 101, an apertured mask 102, and lenses 103 for imaging the mask 102 onto a photographic plate 104. A subject beam 105 is formed by reflection from a subject 106.

A prism 107 is included in the reference beam path for the purpose of separating the color components into distinct non-overlapping bands switch are projected onto the photographic medium 104. A prism, of course, differentially deflects light as a function of frequency, but for the sake of clarity and simplicity, the actual deflection of the light paths has not been shown. Assuming that the light transmitted through the mask 102 is collimated, and dispersion of the prism is small, the light projected through each aperture can be broken into its three color components—red, green and blue—and projected onto the photographic medium 104 such that none of the components overlap. To prevent the overlapping of light from one aperture onto another, the opaque spacings between each aperture should be at least twice as great as the aperture width. As before, the separation of colors into area groups permits formation of a multicolor hologram of subject 106 and reconstruction without crosstalk. The construction of the prism to avoid overlap of the color bands of each aperture and the color bands of adjacent apertures is within the ordinary skill of a worker in the art.

The embodiment of FIG. 14 makes use of the principles of the embodiment of FIG. 13, but it uses an electro-optic prism so that a number of multicolor subjects can be stored on the single two-dimensional medium. Illustratively, these subjects are subjects A, B, and C, only subject A being shown in FIG. 14. A three color coherent source 110 projects light through a beam splitter 111, an apertured mask 112, an electro-optic prism 113 and a pair of lenses 114 which image a mask 112 onto a photographic medium 115. Overlaying the medium 115 is a second apertured mask 117. Electro-optic prism 113 is a triangular prism having two ends (one of which is shown) that are equal and parallel triangles and three sides that are parallelograms. Any of a number of direct current voltages can be applied across opposite parallel faces of the prism 113 by moving a switch arm 118 to various contacts of a rheostat that is connected to a battery 119.

As in the embodiment of FIG. 13, the dispersion of the prism 113 is appropriate for separating the light transmitted through each aperture of mask 112 into its three color components without substantial overlap. Hence, for each elongated aperture or slot of the mask 112, three distinct bands of color are projected toward the photographic medium 115. As is shown more clearly in FIG. 15, the mask 117 contains slotted apertures 120 of an appropriate width to accommodate one group of three color bands that are projected toward a photographic medium. For example, if each slot of mask 112 is 3 mils wide, dispersion by the prism 113 establishes color bands each 3 mils wide with each group of three color bands being 9 mils wide. As shown in FIG. 13, the mask 117 is adjusted so that one group of color bands is projected through each slotted aperture 120. The separation between successive apertures 120 may be 18 mils and still give sufficient resolution for the reconstruction of substantially undistorted images. Since the colors are separated, a multicolor recording of subject A can be made and reconstructed after development of the photographic medium without crosstalk.

After subject A has been recorded, the mask 117 is moved vertically and the switch arm 118 is moved to apply a different voltage on prism 113 so that the color bands shown in FIG. 15 are projected onto a previously unexposed portion of the photographic medium 115. Hence the prism 113 performs a dual function of deflecting the entire reference beam and also dispersing it to separate its color components. Fabrication of a prism from an electro-optic material which is appropriately sensitive to voltage changes as described is within the ordinary skill of a worker in the art. With the mask dimensions shown in FIG. 15, three separate multicolor subjects can be recorded on a single two-dimensional medium and independently reconstructed by illuminating the developed hologram with the reference beam shown, with the mask 117 in the same vertical position, and the switch arm 118 at the same contact position, as was used during recording of the subject to be reconstructed.

Figure 16:
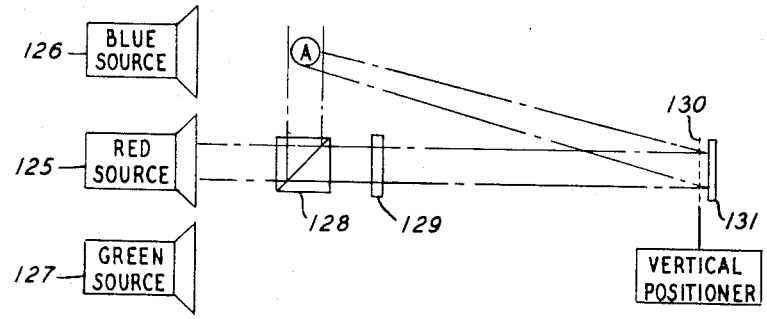
FIG. 16 is a schematic view of hologram recording apparatus in accordance with another embodiment of the invention.
Figure 17:
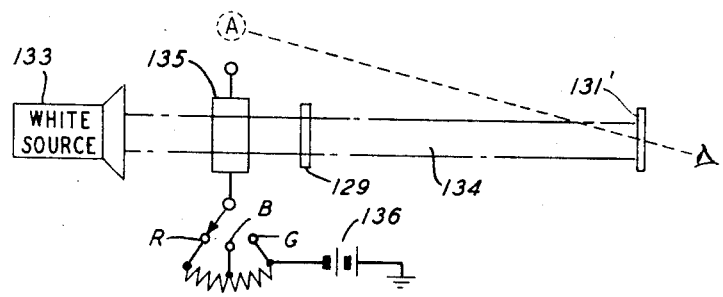
FIG. 17 is a schematic view of hologram reconstructing apparatus in accordance with the embodiment of FIG. 16.

The embodiment of FIGS. 16 and 17 illustrates the principle that the mask used for making multiple recordings in accordance with the invention need not necessarily be used during the reconstruction process if the reference beam is appropriately coded during the recording, and if that coded reference beam is duplicated during the reconstruction step. As shown in FIG. 16, a number of subjects A, B and C are successively recorded by using light from different frequency sources 125, 126 and 127. The subject A is recorded by directing red light from source 125 through a beam spliter 128, a diffusion screen 129, and an apertured mask 130 to the photographic medium 131. As is pointed out in the application of Collier et al. Ser. No. 576,105, filed Aug. 30, 1966, now Pat. No. 3,519,323, and assigned to Bell Telephone Laboratories, Incorporated, a conventional diffusion screen will diffuse light of different colors in different characteristic patterns. Hence, the wave front configuration of light impinging on the mask 130 and photographic medium 131 is different with different frequencies. The red light, of course, is also reflected from subject A and is projected through the apertured mask to expose only certain area groups of the photographic medium. Other subjects B and C are recorded at different subject beam angles with the mask 130 moved vertically to expose successive different area groups of the medium. However, each of the three reference beam colors is diffused by the diffusing screen 129 in a different characteristic manner and is therefore effectively coded. As was pointed out in the Collier et al. application, the superimposed holograms made through the use of different reference beams separately coded in this manner can be independently reconstructed without crosstalk even though the photographic medium is only two-dimensional.

By using the apparatus of FIG. 17, any of the desired subjects A, B and C can be selectively reconstructed from the hologram 131' developed from the photographic medium 131 without using the mask 130 or the separate light sources 125 through 127. The reconstructing apparatus comprises a white light source 133 which projects a white illuminating reference beam 134 through a Matovich-Christiansen filter 135 and the diffusing screen 129 which was used in the recording apparatus of FIG. 16. The filter 135 is of the type described in the paper "Fast Variable Color Filter," by E. Matovich, ISA Journal, vol. 12, December 1965, pp. 53–55. It is made of an appropriate material which transmits only certain optical frequences in response to applied voltages. It is connected to a voltage source 136 through a rheostat having predetermined connections R, B and G for applying to the filter voltages which are appropriate for masking transmission of all colors except red, blue, and green, respectively.

Any of the desired recorded subjects are reconstructed simply by applying to the filter 135 the voltage corresponding to the color at which that subject was recorded. For example, if the subject A is to be reconstructed, the filter is connected to connection R which applies an appropriate voltage to block all of the color components of the reference beam except red. The reference beam is then projected through the diffusing screen 129 which, as mentioned before, diffuses it in a characteristic manner so that precisely the same irregular wave fronts impinge on the hologram 139 as were projected from the diffusing screen 129 of FIG. 16 during the recording process. As a result, the red light impinging on the hologram will interact only with the red color diffraction grating of the hologram to reconstruct only the recorded red color subject A. The diffraction gratings representative of the other recorded subjects will simply diffuse the reference beam light and be manifested as background noise rather than any reconstructed subjects. When the filter 135 is connected to connections B or C, the same principle applies; only the subject representative of the selected color is reconstructed. It can be appreciated that the reconstructing or readout apparatus of FIG. 17 offers advantages of simplicity and easier operation over other embodiments of this invention.

Figure 18:
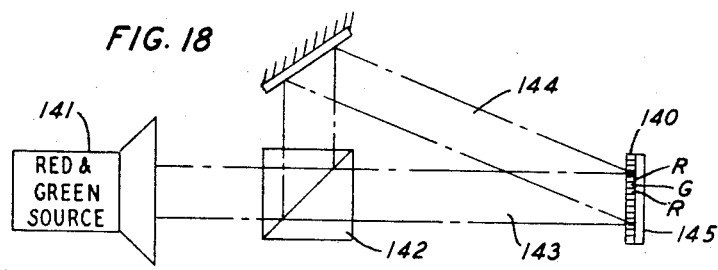
FIG. 18 is a schematic view of apparatus for making a hologram mask and beam splitter in accordance with another embodiment of the invention.

Still another technique for simplifying the use of our invention is to make a hologram beam splitter which also acts as a filter to separate the color components into discrete bands which can be projected for interference with the subject beam to make multicolor holograms on two-dimensional photographic media. Referring to FIG. 18, a hologram filter and beam splitter is made essentially by making a hologram recording of a filter mask 140 which, for purposes of illustration, consists of alternate red and green filter strips. Red and green coherent light from a source 141 is projected through a beam splitter 142 to form light beams 143 and 144 which interfere to produce alternate red and green interference patterns on a three-dimensional photographic medium 145. Of course, the alternate strips on which the red light recordings are made are segregated from the strips on which the green light recordings are made because of the filter mask 140.

As is known, illuminating light projected through a developed hologram will be divided into three components: an undiffracted direct path component, a virtual image component which forms a reconstructed virtual image of the recorded subject, and a real image component which projects a real image of the recorded subject. In accordance with our invention, the hologram developed from medium 145 is used to establish direct path and real image path components which are taken as subject and reference beams for the purpose of making other multicolor holograms.

Figure 19:
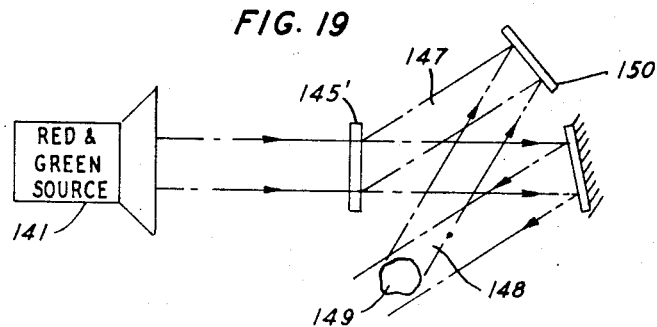
FIG. 19 is a schematic view of hologram recording apparatus in accordance with another embodiment of the invention.

In the apparatus of FIG. 19, the hologram 145' made from the three-dimensional photographic medium 145 of FIG. 18 is used to split light from a red and green source 141 into a reference beam component 147 and a subject beam component 148. The subject beam 148 is the direct undiffracted component projected through the hologram, and as such contains red and green mixed light that is reflected from the subject 149. The real image component projected from the hologram is taken as a reference beam 147, and as such, it projects onto a photographic medium 150 a real image of the information recorded on the hologram 145'. Since the information recorded on the hologram 145' consists of bands of alternate red and green color, these bands are projected onto the photographic medium 150 and thereby define the separate interleaved area groups on which the red and green information from subject 149 is recorded. Photographic medium 150 may therefore be a two-dimensional medium and after it is developed to form a hologram, the subject 149 can be reconstructed by illuminating it with white light as described before.

In the embodiments discussed thus far the exposed area groups of the photographic medium have been interleaved strips with the strips of each group being narrow enough and being separated by a small enough distance that they are resolved by the observer as a group rather than individually. The embodiment of FIG. 20 illustrates a technique in which the various area groups consist of small spots dispersed through the photographic medium. Light from red, green and blue sources 155, 156 and 157 are each divided into subject and reference beam components by beam splitters 158, 159 and 160, respectively. The subject beam components from each source are combined by beam splitters 161 and 162 to form a combined subject beam 163 which is reflected from a subject 164 toward a photographic medium 165.

The reference beam components of the sources 155, 156 and 157 are respectively directed into the ends of optical fiber bundles 167, 168, and 169. As is known optical fibers are fibers capable of transmitting light from one end to the other even though the fiber is bent or curved within certain limitations. The other ends of the fiber bundles are commingled to form a composite optical fiber bundle 171 in which fibers from each of the component bundles are arbitrarily distributed. The output end of the fiber bundle 171 is imaged onto the hologram plane with a lens 173. As a result, red subject beam light interferes to form a red interference pattern only along those spots on photographic medium 165 on which red reference beam light has been imaged. When the photographic medium 165 is developed to form a hologram, illumination by reference beam 172 will give a multicolor reconstruction of the subject 164.

Although this embodiment is a rather cumbersome technique for making hologram photographs, it may be advantageous for other forms of information storage and retrieval. Since the same microscopic areas illuminated during recording should be illuminated by the same frequency components during reconstruction, it is recommended that the photographic medium 165 remain fixed during its development into a hologram so that its relative location with respect to the composite bundle 171 is maintained. It should be understood that while the component fibers are randomly distributed throughout the composite bundle 171, coherent reconstruction of the subject assumes that each of the color components is distributed uniformly throughout the developed hologram. The fibers can be considered therefore to be randomly distributed on an individually microscopic basis, but uniformly distributed on a group or macroscopic basis.

The advantages of our invention can be attained without separating the colors of multicolor light beams as described above if the emulsion of the photographic medium is appropriately treated as illustrated in FIG. 21 to be sensitive only to certain color components of the incoming light. The photographic medium of FIG. 21 comprises a conventional substrate or base 175 and an emulsion 176 which is divided into regions 177 that are sensitive only to incoming red light, regions 178 sensitive only to blue light, and regions 179 sensitive only to green light. Regions 178 through 179 may consist either of interleaved strips or small individual areas uniformly dispersed throughout the medium. The criterion as to size of the component areas of each group should, of course, conform to the criterion set forth above. Holograms are formed on the emulsion 176 by the interference of multicolor subject and reference beam light as described before with the blue interference patterns being formed only on regions 178, the red patterns only on regions 177, and the green patterns only on regions 179. When the medium has been developed to form a hologram, the information of these area groups are independently reconstructed without crosstalk to give the desired composite multicolor reconstruction.

Known emulsion components and masking techniques are used for forming the areas 177, 178, and 179. Normal silver halides, for example, may be used to give the blue sensitive areas 178. The areas 177 are preferably formed by silver halide containing an appropriate known dye to form a red sensitive layer R which is overlaid by a yellow filter layer YF, the purpose of which is to absorb incoming blue light. As is known, appropriately dyed silver halide is sensitive only to red and blue light, which necessitates the yellow filter YF for absorbing the blue light. Likewise, the areas 179 each comprise a layer G made of dyed silver halide overlaid by a yellow filter YF for absorbing incoming blue light.

While many embodiments of the invention have been shown and described, they by no means represent an exhaustive catalog of all of the methods and apparatus in which our inventive concept could be used. Rather, each embodiment has been presented to illustrate a different and distinct feature of the invention which by itself or in combination with other features gives or could give unique advantages. It is clear from the discussion of the various features of the invention that they could be combined in numerous ways to give many structural combinations and process combinations other than those explicitly described. Further, there are many known techniques that have not been mentioned that could well be used in conjunction with the invention. For example, it is well known that the subject and reference beams can impinge on opposite sides of a flat photographic medium for making a hologram. Modifications of the masks, filters, and other features described could easily be made by those skilled in the art to yield structures that are consistent with this technique of hologram recording. The copending application of R. J. Collier, Ser. No. 571,889, filed Aug. 11, 1966, now Pat. No. 3,484,147, describes a technique for superimposing a number of information quanta on a single two-dimensional photographic medium by appropriately coding each successive subject beam during recording and decoding the projected real-image output during the read out process. It is quite clear that for some purposes, the present invention could be coupled with apparatus of this type for increasing the storage capacity of the photographic medium. Numerous other embodiments and modifications may be made by those skilled in the art without departing from the spirit and scope of the invention.

What is claimed is:

1. Apparatus for storing and retrieving information comprising:
   a photosensitive recording medium;
   means for defining a first group of small areas of the recording medium that are substantially uniformly distributed along a surface of the medium;
   means for defining a second group of small areas of the recording medium that are different from the first group, are substantially distributed along the surface of the medium, and are interspersed among the first group of areas;
   means for forming on only the first area group a first interference pattern comprising means for simultaneously exposing the first area group to a first subject light beam and a first reference light beam, the first subject light beam containing a first information quantum;
   means for forming on only the second area group a second interference pattern comprising means for simultaneously exposing the second area group to a second subject light beam and a second reference light beam, the second subject light beam containing a second information quantum;
   means for reconstructing an image of the first information quantum that appears to emanate from substantially the entire recording medium comprising means for illuminating the first area groups with first reference beam light;
   and means for reconstructing an image of the second information quantum that appears to emanate from substantially the entire recording medium comprising means for illuminating the second area groups with second reference beam light.

2. The apparatus of claim 1 wherein the means for defining the first area group and the means for defining the second area group comprise:
   a mask having a plurality of apertures, each aperture having a width on the order of about 3 to 15 mils (0.076 to 0.38 millimeter) and the separation of adjacent apertures being on the order of about 15 to 30 mils (0.38 to 0.76 millimeter);
   means for locating the mask in a first position at which the apertures expose only the first area group;
   and means for locating the mask in a second position at which the apertures expose only the second area group.

3. The apparatus of claim 1 wherein:
   the first subject and reference beam contain a first optical frequency and the second subject and reference beams contain a second optical frequency;
   and the defining means comprises a mask having filter areas at locations corresponding to the first area group that are optically transparent substantially only to the first optical frequency and having other filter areas at locations corresponding to the second area group that are optically transparent substantially only to the second optical frequency.

4. Apparatus for storing and retrieving information comprising:
   a photographic medium;
   means for defining a first group of small areas of the photographic medium that are substantially uniformly distributed throughout the medium;
   means for defining a second group of small areas of the photographic medium that are substantially uniformly distributed through the medium, are interspersed among the first area group, and which do not overlap the first area group;
   means for recording on only the first area group a first information quantum contained on a first subject light beam by interference of the subject beam with first phase-related reference beam light;
   means for recording on only the second area group a second information quantum contained on a second subject light beam by interference of the subject beam with a second phase-related reference beam light;
   means for reconstructing an image of the first information quantum that appears to emanate from substantially the entire recording medium comprising means for illuminating only the first area groups with first reference beam light;
   and means for reconstructing an image of the second information quantum that appears to emanate from substantially the entire recording medium comprising means for illuminating only the second area groups with second reference beam light.

5. The apparatus of claim 4 wherein:
   each area of the area groups is only on the order of about 3 to 15 mils wide and the separation of component areas of each area group is only on the order of about 15 to 30 mils, whereby individual areas are not independently resolved during reconstruction and each reconstructed information quantum appears to emanate from the entire developed photographic medium.

6. The apparatus of claim 4 wherein:
   the means for defining the first area group comprises a first group of filters each capable of transmitting only a first optical frequency;
   the means for defining the second area group comprises a second group of filters each capable of transmitting only a second optical frequency;
   the first information quantum is contained on a light beam of the first optical frequency emanating from a subject;
   the second information quantum is contained on a light beam of the second optical frequency emanating from a subject;
   the first reference beam light is light of the first optical frequency which has been transmitted through the first group of optical filters;
   and the second reference beam light is light of the second optical frequency which has been transmitted through the second group of optical filters.

7. The apparatus of claim 6 wherein:
   the first and second groups of optical filters are contained in a single filter mask that overlaps the photographic medium.

8. The apparatus of claim 6 further comprising:
   means comprising a lens for imaging onto the photographic medium the first group of filters;
   means comprising a lens for imaging onto the photographic medium the second group of filters;
   and wherein the area defining means further comprises means for deflecting reference light such that light imaged onto the photographic medium from the two groups of filters is not overlapped.

9. The apparatus of claim 4 wherein:
   the first reference beam light is of a first optical frequency;
   the second reference beam light is of a second distinct optical frequency.

10. The apparatus of claim 9 wherein:
    the first and second reference beam light is derived from a common source which simultaneously projects light of the first and second optical frequencies;
    and the area defining means further comprises means for separating first and second reference beam light and projecting it respectively onto the first and second area groups of the photographic medium.

11. The apparatus of claim 10 wherein:
    the area defining means comprises an apertured mask through which is projected light of the first and second frequency;
    means for imaging the mask on the photographic medium;
    means for splitting the light transmitted through the mask into a first component that is directed through a first filter which transmits only the first frequency and a second component that is directed through a second filter which transmits only the second frequency;

means for combining the first and second light component;

and means for adjustably deflecting the first component, whereby the first reference beam light of the first frequency can be projected against area groups of the photographic medium which are not exposed to second reference beam light of the second frequency.

12. The apparatus of claim 10 wherein:

the area defining means comprises an apertured mask through which is projected light of the first and second frequencies;

means for imaging the mask on the photographic medium;

and means comprising a prism for dividing the light transmitted through each aperture of the mask into first reference beam light of the first optical frequency and second reference beam light of the second optical frequency.

13. The apparatus of claim 12 further comprising:

a second apertured mask overlaying the photographic medium;

means for moving the second apertured mask vertically, thereby to expose the area groups of the photographic medium;

and wherein the prism comprises means for directing light from one aperture of the apertured mask through one aperture of the second apertured mask.

14. The apparatus of claim 10 wherein:

the area defining means comprises a hologram recording of interspersed areas of light of the first and second frequencies;

means for projecting light containing the first and second optical frequencies through the hologram, thereby establishing a real image component;

said real image component being directed to the photographic medium.

15. The apparatus of claim 9 wherein:

the first group of areas of the photographic medium is defined by photographic medium segments that are sensitive only to the first optical frequency;

and the second group of areas of the photographic medium is defined by photographic medium segments that are sensitive only to the second optical frequency.

16. The apparatus of claim 9 wherein:

the area defining means comprises first and second optical fiber bundles, each comprising optical fibers having first and second ends;

the second ends of the optical fibers of the two bundles being interspersed;

means for directing reference beam light of the first optical frequency into the first ends of the optical fibers of the first bundle;

means for directing reference beam light of the second optical frequency into the first ends of the optical fibers of the second bundle;

and means for imaging the second ends of the optical fibers onto the photographic medium.

17. The apparatus of claim 4 further comprising:

means for forming a first subject light beam containing first information quantum comprising a light source and a first subject on which is incident light from the light source; and means for forming a second subject light beam containing a second information quantum comprising a light source and a second subject, substantially different from the first subject, on which is incident light from the light source.

18. The process of recording and retrieving information comprising the steps of:

directing subject beam light containing a first information quantum and phase-related first reference beam light against a first group of small areas distributed along a surface of a photographic medium to form a first array of interference patterns;

directing subject beam light containing a second information quantum and phase-related second reference beam light against a second group of areas distributed along the photographic medium surface to form a second array of interference patterns;

illuminating only the first area group with first reference beam light to reconstruct the first information quantum;

and illuminating only the second area group with second reference beam light to reconstruct the second information quantum.

19. The process of claim 18 further comprising the steps of:

positioning an apertured mask over the photographic medium to expose only the first area group to the subject beam and first reference beam light;

repositioning the apertured mask to expose only the second area group to the subject beam and second reference beam light.

20. The process of claim 18 further comprising the steps of:

directing the subject beam light containing the first information quantum and the first reference beam light through masks having interspersed opaque and transparent areas which are imaged onto the photographic medium to expose only the first area group;

directing the subject beam light containing the second information quantum and the second reference beam light through masks having interspersed opaque and transparent areas which are imaged onto the photographic medium to expose only the second area group.

21. The process of claim 20 further comprising the steps of:

deflecting the subject beam light containing the second information quantum which is transmitted through a mask with respect to the subject beam light containing the first information quantum which is transmitted through the mask to expose the second area group to subject beam light containing the second information quantum;

and deflecting the second reference beam light transmitted through a mask with respect to first reference beam light transmitted through the mask to expose the second area group to second reference beam light.

22. The process of claim 18 wherein:

the subject beam light containing the first information quantum is light of a first optical frequency reflected from a subject;

the subject beam light containing the second information quantum is light of a second distinct optical frequency reflected from the subject;

the first reference beam light is light of only the first optical frequency;

and the second reference beam light is light only of a second optical frequency.

23. The process of claim 22 wherein:

the subject beam light containing the first information quantum, the subject beam light containing the second information quantum, the first reference beam light, and the second reference light are directed against the photographic medium simultaneously.

24. The process of claim 18 further comprising the steps of:

forming subject beam light containing a first information quantum by directing light onto a first subject; and forming subject beam light containing a second information quantum by directing light onto a second subject, substantially different from the first subject.

25. The holographic process of recording an image of a multicolor subject comprising the steps of:

directing multifrequency light from the subject against a photographic medium;

simultaneously directing reference beam light of only a first optical frequency against only a first group of small areas distributed throughout a surface of the photographic medium to form a first interference pattern;

and simultaneously directing reference beam light of a second optical frequency against only a second group of small areas distributed throughout the surface of the photographic medium and interspersed among the first group to form a second interference pattern.

26. The process of claim 25 further comprising the steps of:

separating the light from the subject into a first component containing only the first optical frequency and a second component containing only the second optical frequency;

exposing only the first area group to the subject light component of the first optical frequency;

and exposing only the second area group to the subject light component of the second optical frequency.

27. The process of claim 25 further including the process of reconstructing the image of the recorded subject comprising the steps of:

developing the photographic medium to form a hologram therefrom;

and simultaneously directing reference beam light of the first frequency against only the first area group and reference beam light of the second frequency against only the second area group.

28. The process of claim 25 further comprising the steps of:

making a hologram recording of multifrequency light which is directed through a mask containing filters that transmit only the first optical frequency which are interspersed among filters which transmits only the second optical frequency;

directing multifrequency light through the hologram to form a real image component;

and directing the real image component against the photographic medium.

29. In apparatus for making hologram recordings of multicolor subjects, the improvement comprising:

a photographic medium having a first group of surface areas distributed uniformly throughout a surface thereof, and a second group of areas uniformly distributed throughout the surface and interspersed among the first area group;

each of the first areas being defined by a photographic material which is sensitive only to light of one frequency, and each of the second areas being defined by photographic material being sensitive only to light of a second frequency.

References Cited

UNITED STATES PATENTS

| | | | |
|---|---|---|---|
| 648,748 | 5/1900 | Ives | 350—196UX |
| 3,028,782 | 4/1962 | Bernhardt et al. | 356—109 |
| 3,043,179 | 7/1962 | Dunn | 350—96 |
| 3,306,974 | 2/1967 | Cunnally | 350—168UX |

OTHER REFERENCES

Gabor: "Character Recognition by Holography," Nature, vol. 208, Oct. 30, 1965, pp. 422–423.

Gabor et al., "Interference Microscope With Total Wavefront Reconstruction," Journal of the Optical Society of America, vol. 56, No. 7, July 1966, pp. 849–858. (Published July 15, 1966.)

JOHN K. CORBIN, Primary Examiner

U.S. Cl. X.R.

350—169, 271, 317; 356—106